United States Patent [19]

Ferrigno

[11] Patent Number: 5,024,018
[45] Date of Patent: Jun. 18, 1991

[54] ADJUSTABLE BELT-ATTACHED FISHING ROD HOLDER

[76] Inventor: Michael R. Ferrigno, 96 Stratford Rd., Tinton Falls, N.J. 07724

[21] Appl. No.: 511,017

[22] Filed: Apr. 19, 1990

[51] Int. Cl.⁵ .............................................. A01K 97/10
[52] U.S. Cl. ........................................ 43/21.2; 224/922; 224/200; 224/253
[58] Field of Search ............... 224/922, 200, 253, 901; 43/21.2

[56] References Cited

U.S. PATENT DOCUMENTS

| D. 187,651 | 4/1960 | Hiering | 224/922 X |
| 2,576,624 | 11/1951 | Miller | 224/200 X |
| 2,719,659 | 10/1955 | Bowman | 224/253 |
| 3,115,997 | 12/1963 | Hengst | 224/253 X |
| 3,294,298 | 12/1966 | Danielson | 224/253 |
| 3,782,613 | 1/1974 | Davis | 224/253 |
| 3,920,207 | 11/1975 | Adamaitis | 224/251 X |
| 4,418,733 | 12/1983 | Kallman | 224/901 X |
| 4,817,323 | 4/1989 | Braid | 43/21.2 |

Primary Examiner—Richard K. Seidel
Assistant Examiner—Patty E. Hong

[57] ABSTRACT

A two-piece belt-attached fishing rod holder comprising a flap upper portion to serve as a belt-attaching means and receptacle through which to thread the lower rod support flap. The areas of the upper portion and lower rod support flap that intersect on the rear side of the upper portion contain Velcro or any hook and barb fastener strips which are used as a means to secure the two pieces together while affording the full range of adjustability contained within.

3 Claims, 1 Drawing Sheet

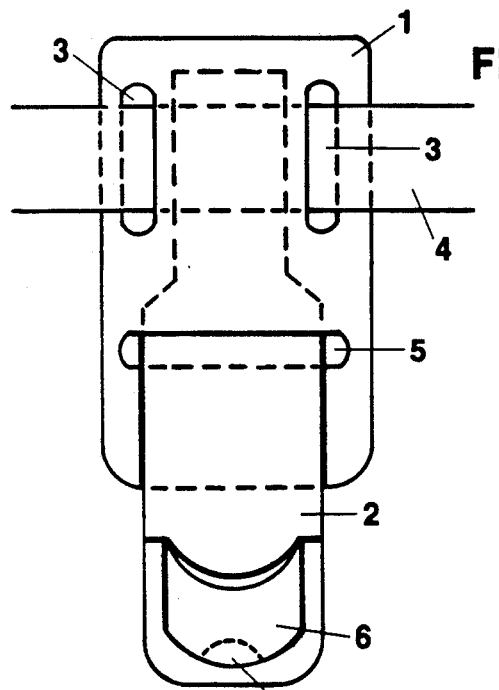 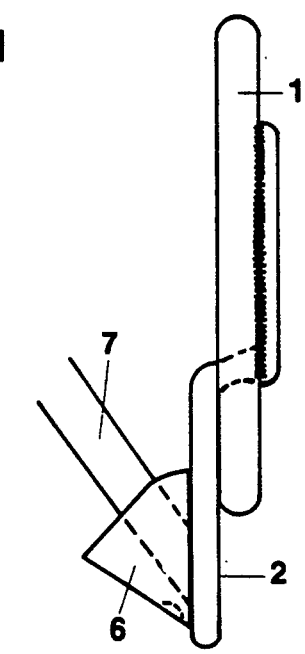 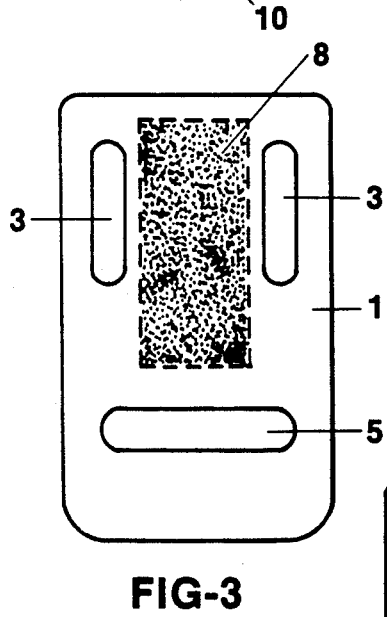 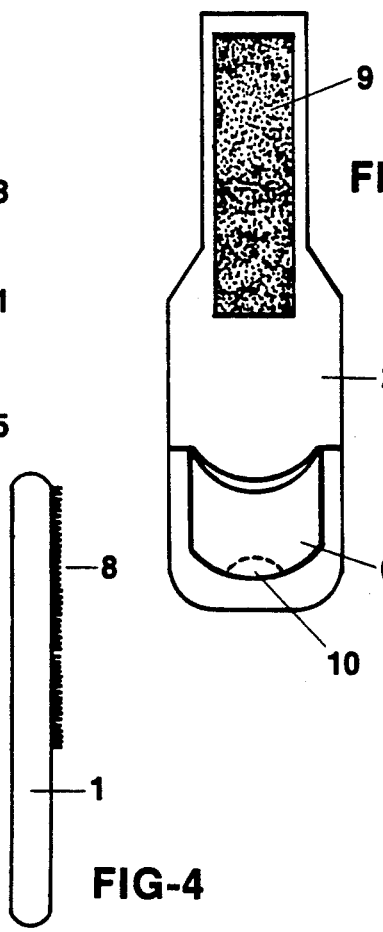 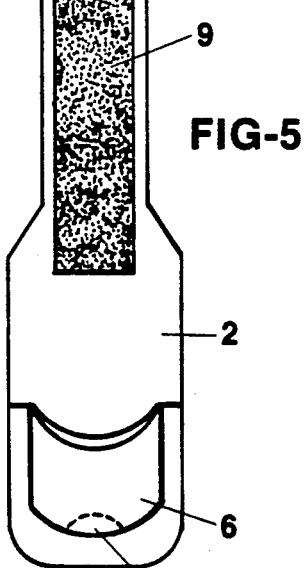 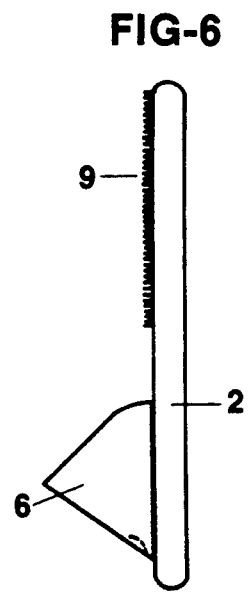

ADJUSTABLE BELT-ATTACHED FISHING ROD HOLDER

BACKGROUND a) Field of Invention

This invention relates to fishing equipment and accessories, but more specifically deals with fishing rod holders.

b) Description of Prior Art

In the process of researching prior patents regarding similar subject matter, it was discovered that any currently patented fishing rod holder was very inflexible to the needs of the user. Any of the other belt-attached holders which were discovered were designed to be used in a rather passive fashion instead of while actively fighting a fish or retrieving a lure. The use of this holder will also prevent any unnecessary wear on the waders or other clothing worn by the fisherman which might be caused by the butt end of the fishing rod during its normal use. Any other prior art was also found to be very inflexible in fit for the user. One size was designed to fit all but the adjustability of this belt-attached rod holder makes it comfortable and easy to use for all.

SUMMARY

This invention relates to a device which is both able to be used while actively fishing and using the fishing rod and reel instead of merely sitting down to be used as a holder and can be custom-fitted to the fisherman so as to afford the most advantageous fishing rod positioning with relative ease. The butt end of the fishing pole is held in the receptacle in a more secure fashion than merely being held against the hip by the pressure from the fisherman. It comprises a means for attaching the holder to a belt and thus may be worn outside any given amount of clothing which might be worn by the fisherman if given the proper sized belt. Its adjustability will afford fishermen of any stature a maximum amount of comfort and functionality of this device.

It is an object of this invention to provide the fisherman a means of securing the butt end of the fishing pole against himself so as to facilitate the use of the pole while standing in an upright position.

BRIEF DISCUSSION OF DRAWINGS

FIG. 1 is a front view of an adjustable belt-attached fishing rod holder showing my new design, illustrating how it is attached to a belt being worn by the fisherman. FIG. 1 also shows an integral belt-attaching means as well as an integral means for threading and adjusting the rod support flap.

FIG. 2 is a right sideview thereof also showing the butt end of the fishing rod inserted into the holder.

FIG. 3 shows a front view of the upper portion of the holder, the broken line representing a Velcro or any hook and barb fastener strip on the rear side to be used for attaching and adjusting the rod support flap.

FIG. 4 shows right side view of upper portion with Velcro or any hook and barb strip on rear.

FIG. 5 shows front view of rod support flap with Velcro or any hook and barb strip to be used to mate with Velcro or any hook and barb strip on upper portion of rod holder.

FIG. 6 is a left side view of rod support flap.

DESCRIPTION OF PREFERRED EMBODIMENT

Referring to the drawings where the illustrations are for the purposes of a preferred embodiment, but are not to be limited to same.

FIG. 1 shows a full frontal view of the new adjustable belt-attached fishing rod holder. The two-piece assembly may be constructed from leather or some other weather and water resistant material. The upper portion (1) of the holder contains two vertically-extending slots (3) through which belt (4) of the fisherman is passed thereby positioning rod holder properly at the fisherman's side. The integral belt-attaching means may obviously take many means such as hooks which may be hooked over a belt. The lower section of the upper portion of the holder also contains a centrally-located horizontally-oriented slot (5) to serve as a means for threading the lower rod support flap (2). This lower rod support flap (2) also contains the means for securing and holding the fishing rod (7) to the holder (6) so it may be used while actively fishing. The lower rod support flap (2), after being threaded through the slot (5) in the upper portion (1), may be fastened in an infinite number of locations by means of Velcro or any hook and barb fastener (8 and 9) or any other material or means similar in function so as to fit properly a person of any stature. The full range of the adjustability of this holder can be determined by the length of the upper portion (1) and orientation of slot (5) thereon as well as length of tab on the lower rod support flap. The cup (6) into which the butt end of the fishing pole (7) in inserted (FIG. 2) is deep enough to securely retain the butt end of the fishing rod (7) as well as being of sufficient diameter and taper for easy and rapid placement of the fishing rod. A small, centrally located opening (10) at the base of the cup (6) may be provided so as to prevent sand, sediments, or other debris from accumulating in the cup (6).

As was described in the foregoing, the preferred embodiment illustrates an infinitely adjustable rod holding means which may be readily adapted to whatever the preferred positioning is for the user as will be determined by both the user's stature and the size and type of fishing rod being used and the desired angle one prefers to use to hold the fishing rod. There are several different preferences with regard to rod size and type, and the rod holder described provides a maximum amount of versatility in this regard.

Although the invention has been shown and described with respect to a preferred embodiment, it is obvious that equivalent alterations and modifications will occur to others skilled in the art upon the reading and understanding of this specification. The present invention includes all such equivalent alterations and modifications and is limited only by the scope of the claims.

The embodiments of the invention in which an exclusive property or privilege is claimed is defined as follows:

1. A two-piece adjustable belt-attached fishing rod holder comprising:

an upper portion having a front and a back with an integral belt-attaching means and an integral horizontally-oriented slot located in the lower central region of said upper portion, with one side of a hook and barb fastener centrally located on the back above the horizontal slot and between the belt-attaching means; and a lower rod support flap having a front and a back with the front of the flap having an integral upwardly-opening and outwardly-extending cup located at the lower area of said flap to serve as a means for receiving and securing the butt end of the fishing rod and also having the complementary side of the hook and barb fastener located along the upper central portion of the front of said flap;

wherein the lower rod support flap is threaded through the integral horizontal slot in the upper portion such that the flap threads from the front to the back of the upper portion, the two sides of the hook and barb fastener being mated together on the back of the upper flap thus providing adjustability.

2. A two-piece adjustable belt-attached fishing rod holder as in claim 1, wherein said integral upwardly-opening and outwardly-extending cup on the lower rod support flap has a small opening centrally located at the base of said cup so as to permit sand, sediments, or other debris from accumulating in said cup.

3. A two-piece adjustable belt-attached fishing rod holder as in claim 1, wherein the belt-attaching means comprises two vertical slots on opposite extremes of the upper region of the upper flap so as to enable threading of a belt therethrough.

* * * * *